United States Patent [19]

Miyamaru et al.

[11] Patent Number: 4,644,318

[45] Date of Patent: Feb. 17, 1987

[54] AUTOMATIC DIRECTION INDICATOR CANCELLING APPARATUS

[75] Inventors: Yukio Miyamaru, Tokyo; Shigeo Kawada, Saitama; Kaoru Hatanaka, Saitama; Yasuo Shibata, Saitama, all of Japan

[73] Assignee: Honda Giken Kogyo Kabushiki Kaisha, Tokyo, Japan

[21] Appl. No.: 782,602

[22] Filed: Sep. 30, 1985

Related U.S. Application Data

[63] Continuation of Ser. No. 384,347, Jun. 2, 1982, abandoned.

[30] Foreign Application Priority Data

Jun. 2, 1981 [JP] Japan ................................ 56-84563

[51] Int. Cl.4 ............................................ B60Q 1/34
[52] U.S. Cl. ....................................... 340/73; 340/56
[58] Field of Search ...................... 340/55, 56, 62, 73, 340/81 R

[56] References Cited

U.S. PATENT DOCUMENTS 4,213,116  7/1980  Holtzman et al. .................... 340/73
4,333,071  6/1982  Kira et al. .......................... 340/73 X
4,403,211  9/1983  Shibata et al. ....................... 340/56

FOREIGN PATENT DOCUMENTS 54-47901  1/1979  Japan .................................... 340/56

Primary Examiner—John W. Caldwell, Sr.
Assistant Examiner—Tyrone Queen
Attorney, Agent, or Firm—Irving M. Weiner; Joseph P. Carrier; Pamela S. Burt

[57] ABSTRACT

A circuit arrangement for automatically switching off the turn signal of a vehicle, e.g., a motorcycle. The turning angle of the handlebar of the motorcycle is detected electrically, i.e., it is neglected when the vehicle travels at a lower speed, and the maximum swing of the handlebar is memorized. In returning the handlebar to the center position, when the turning angle differs from the maximum swing by a predetermined value, a turn signal cancelling signal is produced, which is also used to reset the circuit so that the circuit responds correctly when the turn signal action is repeated successively.

1 Claim, 3 Drawing Figures

AUTOMATIC DIRECTION INDICATOR CANCELLING APPARATUS

This is a continuation of application Ser. No. 384,347, filed June 2, 1982, now abandoned.

BACKGROUND OF THE INVENTION

1. Field of the Invention

The present invention relates to an automatic direction indicator cancelling apparatus for use, particularly, in motorcycles.

More particularly, the invention relates to an automatic direction indicator cancelling apparatus wherein the turning angle of the handlebar is converted into an electrical signal so as to be processed by the control circuit which does not respond to a turning angle during travel at a certain low speed, while the control circuit detects a predetermined signal level when the turning angle makes a change from a maximum (or minimum) value so that the operation of the direction indicator is cancelled automatically when the handlebar is returned to the center position following a turn during normal driving conditions. The cancelling signal is fed back within the control circuit so that the circuit is initialized upon completion of the cancelling operation.

2. Description of the Prior Art

The applicant has proposed an automatic direction indicator cancelling apparatus, for use in motorcycles, which operates by detecting the turning angle of the handlebar. This apparatus comprises an electrical circuit for processing signals and the circuit is arranged in consideration of the driving characteristics of motorcylces such that the circuit does not respond to the swing of the handlebar during low-speed driving, while it responds correctly to the movement of the handlebar during travel at a predetermined speed. Thorough studies have been continued for dealing with further specific driving conditions of motorcycles, and have led to the present invention.

SUMMARY OF THE INVENTION

It is an object of the present invention to provide an automatic direction indicator cancelling apparatus which is arranged such that when the vehicle has undergone a turn in one direction and then is going to undergo another turn in the same direction, the state of the circuit which has been established by the automatic cancelling action for the first turn does not affect the automatic cancelling action for the second turn.

DETAILED DESCRIPTION OF THE PREFERRED EMBODIMENT

The present invention will now be described in detail by way of a preferred embodiment with reference to the accompanying drawings.

Figure 1:
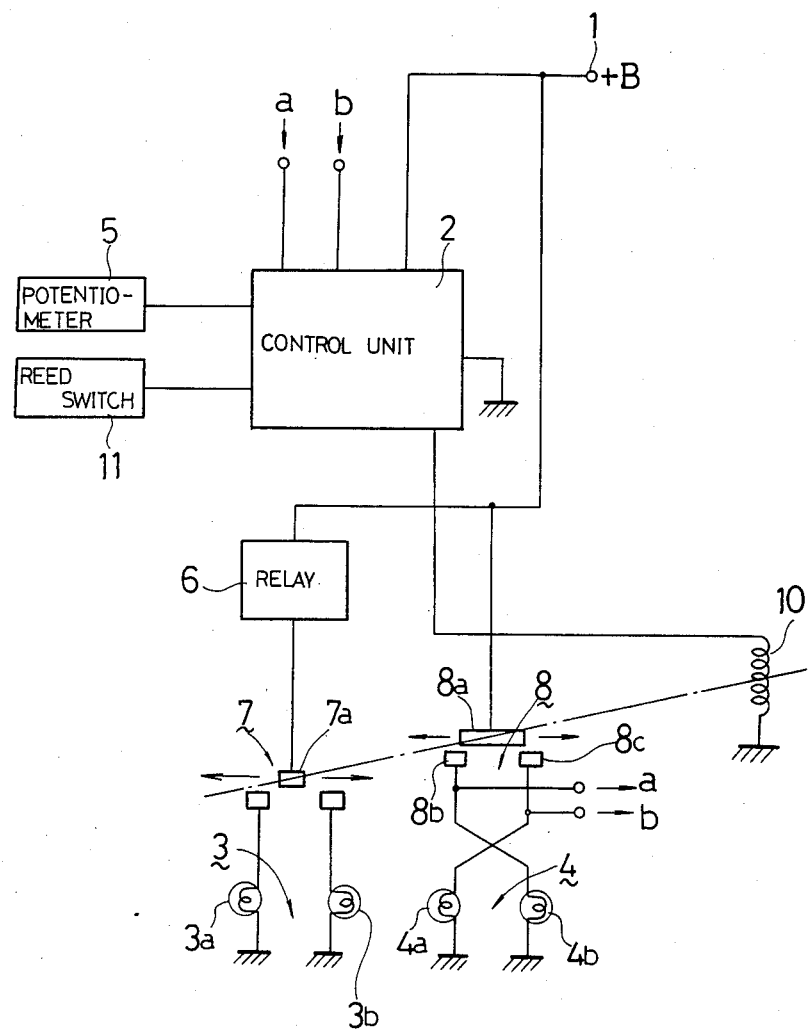
FIG. 1 is a general systematic diagram showing one embodiment of the apparatus in accordance with the present invention.

In FIG. 1, the power voltage is supplied through the terminal 1 to the control unit 2, blinker lamps 3, position lamps 4, and potentiometer 5 which detects the turning angle of the handlebar.

The blinker lamps 3 comprise a left-turn blinker lamp 3a and a right-turn blinker lamp 3b, and each lamp blinks in operation by the action of a relay 6. One of the lamps 3a and 3b is selected for operation by sliding the moving contact 7a of the direction indicator switch 7.

The position lamps 4 serve to notify another party of the presence of the motorcycle, and each lamp is illuminated during travel unless the corresponding blinker lamp is operating. The position lamp switch 8 has a moving contact 8a, which is set to the neutral position when the vehicle is being driven so that it is in contact with both contacts 8b and 8c to thereby keep the lamps 4a and 4b illuminated. When the direction indicator switch 7 is operated for making a turn of the vehicle, the contact 8a is moved together with the contact 7a, and one of the lamps 4a and 4b corresponding to the turning direction is turned off. In this circuit arrangement, the intended turning direction can be detected electrically by checking signals a and b derived from the position lamp circuit.

Figure 2:
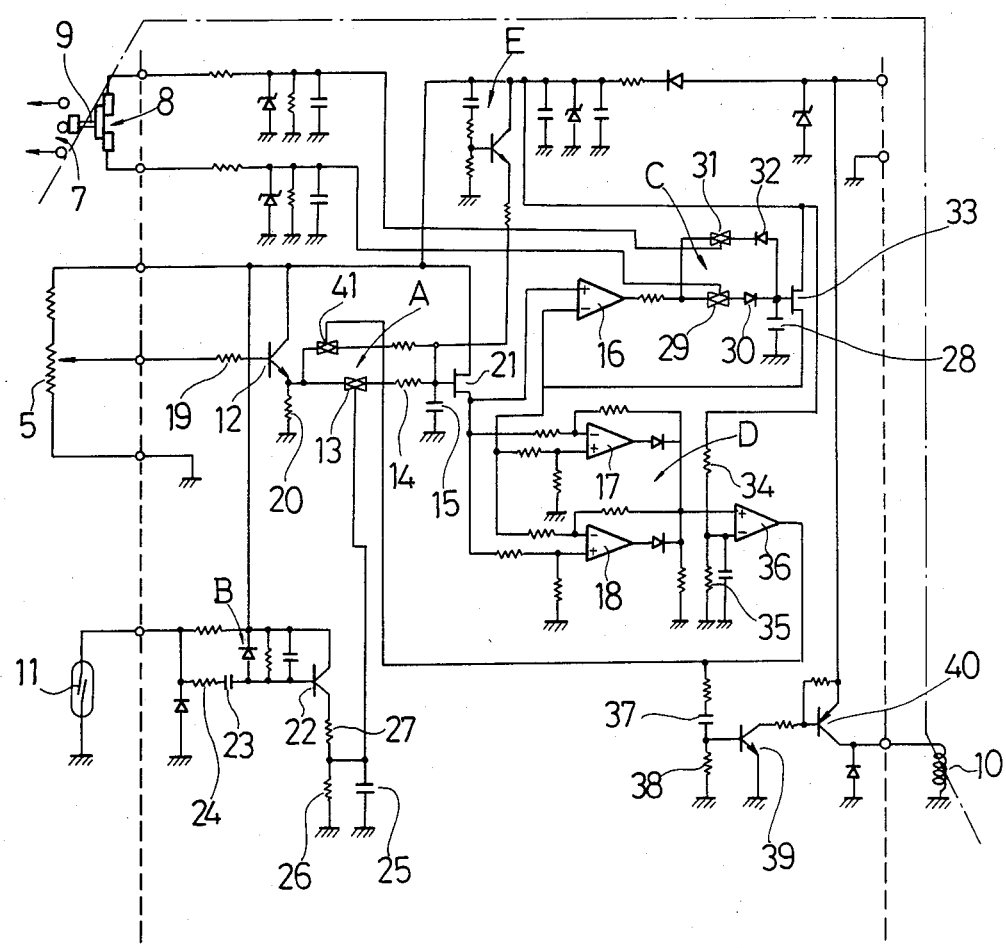
FIG. 2 is a particular schematic diagram of the control unit shown in FIG. 1.

The moving contact 7a of the direction indicator switch 7 and the moving contact 8a of the position lamp switch 8 are served by a single contact 9 as shown in FIG. 2. In addition, after the turning of the vehicle has been completed, the direction indicator switch 7 and the position lamp switch 8 are restored to the neutral position by the electromagnetic action of the solenoid 10 which operates when the turning has been completed.

The control unit 2 receives a voltage signal from the potentiometer 5 which detects the turning angle of the handlebar, a pulse signal from a reed switch 11 for measuring the vehicle speed, and the above-mentioned signals a and b from the position lamp circuit. The circuit in the control unit 2 processes these signals so that the blinking operation of a blinker lamp which has been activated by the driver is cancelled automatically.

Next, the circuit arrangement of the control unit 2 will be described in detail with reference to FIG. 2.

The potentiometer 5 is provided between the main frame of the motorcycle and the handlebar so that is provides the output voltage in accordance with the turning angle of the handlebar. The voltage signal from the potentiometer 5 is fed to circuit A which eliminates noises from the signal.

The noise eliminating circuit A functions to attenuate the signal from the potentiometer 5 when the vehicle travels at a predetermined low speed. This function is achieved by the combination of a semiconductor switch (e.g., bilateral switch) 13, which is connected to the output terminal of the transistor 12 so that its mode of conduction or non-conduction is controlled by the output signal of circuit B for detecting the vehicle speed, and a time-constant circuit made up of a resistor 14 and a capacitor 15.

The speed detecting circuit B provides the output in the form of a pulse train and, therefore, the output signal increases to a higher frequency as the vehicle speed increases and decreases to a lower frequency as the speed decreases. Consequently, the switching device 13 which becomes conductive in response to the high-level signal from the speed detecting circuit B turns on more frequently as the vehicle gains speed, and the device turns on less frequently as the vehicle slows down. Due to the operation of the switching device 13, the time-constant circuit including the resistor 14 and capacitor 15 virtually changes its characteristics depending on the vehicle speed. That is, the circuit provides a large time constant at a low speed, and the time constant approaches the value determined solely by the resistor 14 and capacitor 15 as the speed increases. Due to the circuit operation as described above, the signal which the circuit A receives from the potentiometer 5 at a predetermined travel speed is passed directly to the amplifiers 16, 17 and 18. At a certain low speed, the signal from the potentiometer 5 is attenuated, and then passed to the amplifiers. The transistor 12 and resistors 19 and 20 constitute a buffer for interfacing the potentiometer 5, and a field effect transistor (FET) 21 serves to prevent the voltage across the capacitor 15 from being varied due to the discharge current from the capacitor 15 and the currents from the amplifiers 16, 17 and 18.

The vehicle speed detecting circuit B includes a transistor 22 which is turned on and off in response to the two-state signal produced by the reed switch 11 provided on the vehicle. It will be understood that reed switch 11 is turned on and off in a known manner by any suitable member operating in correspondence with the vehicle speed, such as by a magnet fixed to a speedometer cable which rotates in proportion to rotation of the front wheel. In more detail, when the reed switch 11 is open, a capacitor 23 discharges to cut off the transistor 22; when the reed switch 11 is closed, the capacitor 23 charges through a resistor 24 to turn on the transistor 22. The operation of the transistor 22 charges a capacitor 25 or discharges it through a resistor 26, thereby turning on and off the switching device 13 as mentioned previously. The on-period of the switching device 13 is determined by the values of the resistor 26 and capacitor 25. In this manner, the vehicle speed detecting circuit B provides the signal which represents the vehicle speed.

Circuit C is a peak holding circuit, in which a voltage corresponding to the maximum (or minimum) voltage provided by the potentiometer 5 during the turning of the vehicle is held across a capacitor 28. The peak holding circuit C includes a parallel connection of a branch path including a semiconductor switching device 29 and a diode 30 and another branch path including a semiconductor switching device 31 and a diode 32 connected between the non-grounded terminal of a capacitor 28 and the output terminal of the amplifier 16. The switching devices 29 and 31 are controlled by the signals a and b, respectively, derived from the position lamp circuit. In more detail, the signal a at a high level makes the switching device 29 conductive and the signal a at a low level makes the device non-conductive. Similarly, the signal b at a high level makes the switching device 31 conductive and the signal b at a low level makes the device non-conductive. When the vehicle is driven without the direction indicator switch being operated, both signals a and b are high, causing the switching devices 29 and 31 to be conductive. The output of the circuit C is fed to the input terminals of the differential amplifiers 17 and 18.

When the vehicle is being driven, the amplifiers 17 and 18 receive the output of the circuit C having the same voltage as the output of the circuit A. When the vehicle is going to turn in either direction, one of the switching devices (29 or 31) corresponding to the turning direction becomes conductive, then the maximum (or minimum) voltage supplied from the circuit A to the circuit C is held (peak holding) by the capacitor 28, and this voltage is passed to the input terminals of the amplifiers 17 and 18. An FET 33 is provided so that the voltage across the capacitor 28 does not vary.

The differential amplifiers 17 and 18 in the comparison circuit D receive at their one input terminal the output of the circuit A and at their other input terminal the peak voltage held in the circuit C when the vehicle makes a turn, so that the potentiometer output voltage which may vary during turning of the vehicle is compared with the maximum (or minimum) voltage at the time of turning. The amplifier 17 provides the difference between the voltage received at the negative terminal from the noise eliminating circuit A and the maximum peak voltage received at the positive terminal. Similarly, the amplifier 18 provides the difference between the voltage received at the positive terminal from the circuit A and the minimum peak voltage received at the negative terminal. These output voltages represent the returning angle of the handlebar following the turning operation of the handlebar for a right-turn and left-turn of the vehicle. If one of the output voltages of the amplifiers 17 and 18 becomes larger than the voltage which is presented by resistors 34 and 35, the amplifier 36 provides a high level signal which will be used to cancel the direction indicator.

The output of the amplifier 36 is differentiated by the capacitor 37 and resistor 38 to produce a single pulse signal, which is then amplified by transistors 39 and 40, and applied to the solenoid 10. The pulse voltage energizes the solenoid 10 momentarily so that the direction indicator switch and position lamp switch are restored to the neutral position as described previously.

The direction indicator cancelling signal provided by the amplifier 36 is further supplied to the semiconductor switching device 41 provided between the above-mentioned capacitor 15 and transistor 12, and the cancelling signal from the amplifier 36 makes the switching device 41 conductive so that the voltage across the capacitor 15 is made substantially equal to the voltage from the potentiometer 5. This circuit arrangement is an important feature of the present invention.

As shown in FIG. 2, a circuit E is arranged for providing a dummy voltage to the capacitor 15 whenever the power source for the entire circuit is turned on, which dummy voltage represents the center position of the handlebar, so that the direction indicator cancelling apparatus works appropriately during the initial phase of operation. Such turning-on of the power source is generally performed only once, before the vehicle begins to move.

In the foregoing arrangement, when the vehicle is being driven, the potentiometer 5 produces a voltage signal which represents the turning angle of the handlebar with respect to the main frame of the vehicle, and the signal is delivered through the circuit including the transistor 12 and capacitor 15 to the negative input terminal of the comparing amplifier 17 and the positive input terminal of the comparing amplifier 18. When the direction indicator switch is operated, the position lamp corresponding to the turning direction goes off and the blinker lamp on the same side starts to blink. At the same time, one of the switching devices (29 or 31) corresponding to the turning direction becomes non-conductive to thereby hold a peak voltage (the maximum voltage or minimum voltage depending on the turning direction) across the capacitor 28, and this voltage is passed to the input terminals of the amplifiers 17 and 18. Upon completion of the turning movement of the vehicle, when the handlebar is moved to the center position, the voltage across the capacitor 15 varies in response to the variation of the output voltage of the potentiometer 5 and returns to the initial voltage corresponding to the center position of the handlebar. During the process, one of the output voltages of the amplifiers 17 and 18 will exceed the predetermined reference voltage, causing the amplifier 36 to produce a cancelling signal. Thus, the direction indicator apparatus completes the automatic cancelling operation.

The following description relates to the specific operation based on the present invention. In the foregoing arrangement, when the vehicle makes turns twice in the same direction successively (e.g., a right-turn followed by another right-turn), the direction indicator switch may have to be operated twice. In this case, the voltage across the capacitor 15 creates a residual effect due to the first cancelling operation. That is, the variation of the voltage across the capacitor 15 lags behind the variation of the output voltage of the potentiometer 5, resulting in an inconsistency between the output voltage of the transistor 12 and the voltage across the capacitor 15. Consequently, when the direction indicator switch is operated a second time, the voltage across the capacitor 15 can possibly be held as a peak voltage by the capacitor 28. In order to prevent such faulty operation, the circuit is arranged such that the voltage across the capacitor 15 is always reset to the voltage of the potentiometer 5 once the cancelling operation has been completed, by provision of the switching device 41, which becomes conductive in response to the cancelling signal from the amplifier 36, between the transistor 12 and the capacitor 15.

The purpose of the differentiation circuit provided in the output section of the circuit is to activate the solenoid 10 momentarily to thereby prevent a permanent excitation of the solenoid 10, which is undesirable from the standpoint of a long service life, if the direction indicator switch is locked by failure.

Figure 3:
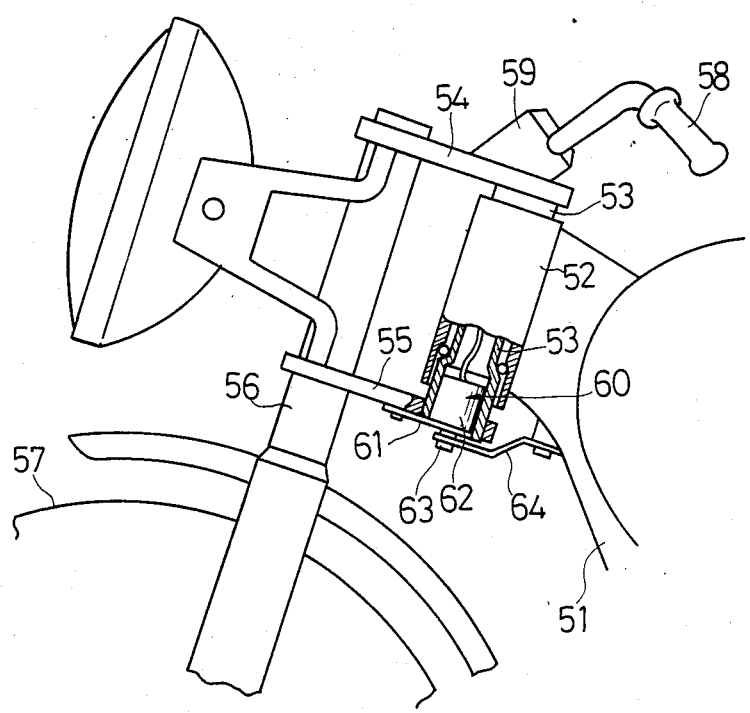
FIG. 3 is a diagrammatic view of a steering system of a motorcycle associated with a handlebar of the motorcycle.

Referring to FIG. 3, a steering system of a typical motorcycle includes a head pipe 52 integrally connected to a body frame 51, a steering stem 53 rotatably extending through the head pipe 52, top and bottom bridges 54 and 55 firmly connected to the upper and lower ends of the steering stem 53, respectively, a front fork 56 fixed to the top and bottom bridges and supporting a front wheel 57, and a handlebar 58 connected to a bracket 59 for steering the motorcycle in a conventional manner. A steering angle sensor 60 including the potentiometer 5 therein comprises a housing 62 which is mounted in the bottom of the steering stem 53 and is retained therein by a mounting arm 61 such that the housing 62 is fixed with respect to the stem 53 and the bridges 54 and 55, and that the housing 62 can rotate as the handlebar 58 turns the front fork 56 for steering by virtue of the arm 61. The sensor 60 also comprises a shaft 63 which is suitably mounted in the housing 62 and extends at one end externally from the bottom of the housing 62. A stay 64 is provided between the frame 51 and the shaft 63 to connect same in such a manner that the shaft 63 is maintained in a fixed position with respect to the frame 51. As will be apparent from the above description, the potentiometer 5 is arranged between the sensor housing 62 and the sensor shaft 63, and operates in a known manner to detect the turning angle of the handlebar by the relative rotary movement between the housing and the shaft.

As will be understood from the foregoing description, according to the present invention, the automatic cancelling of the direction indicator is carried out normally even if the direction indicator switch has to be operated in the same direction immediately following the completion of the automatic cancelling operation for the first turning movement of the vehicle, thereby enhancing the operating characteristics of the vehicle.

What is claimed is:

1. An automatic cancelling apparatus for a direction indicator of a vehicle, comprising:
    a sensor which provides a signal representing the turning angle of a handlebar of said vehicle;
    speed detecting means for detecting the speed of said vehicle;
    a noise eliminating circuit which receives the output of said sensor and eliminates high-frequency components from the output of said sensor to thereby provide a signal representing a current turning angle of said handlebar;
    said noise eliminating circuit including a first switching means connected to said sensor and a time constant circuit connected to said first switching means and adapted to output said signal representing the current turning angle of said handlebar, said first switching means being adapted to become conductive less frequently at a relatively low speed of said vehicle and more frequently at a relatively high speed of said vehicle in response to the output of said speed detecting means so that said time constant circuit provides a relatively large time constant at the relatively low speed of said vehicle and the time constant of said time constant circuit approaches an inherent time constant thereof as the vehicle speed increases;
    second switching means for connecting said turning angle sensor to said noise eliminating circuit, said second switching means being normally nonconductive;
    a position lamp circuit for indicating an intended turning direction;
    a peak holding circuit which receives the output of said noise eliminating circuit and the output of said position lamp circuit and holds a peak value of said output signal of said noise eliminating circuit;
    a comparison circuit which receives said output of said noise eliminating circuit and the output of said peak holding circuit to provide the difference to said outputs and provides a cancelling signal when said difference exceeds a predetermined value;
    cancelling means which receives said cancelling signal and thereby resets said direction indicator; and
    said cancelling signal also being supplied to said second switching means to render it conductive so that a turning angle value to be held by said noise eliminating circuit is set at a value of current turning angle of said handlebar.

* * * * *